3,129,160
DESENSITIZED GLASS MEMBRANE AND THE METHOD AND COMPOSITION FOR PRODUCING THE SAME
Norman W. Carter, Dallas, Tex., assignor to Beckman Instruments, Inc., Fullerton, Calif., a corporation of California
No Drawing. Filed Apr. 25, 1962, Ser. No. 189,959
30 Claims. (Cl. 204—195)

This invention relates to new and useful improvements in cation sensitive glass electrodes and methods of producing the same.

The invention is particularly concerned with cation sensitive glass electrodes having selected areas or a selected area of inhibited sensitivity, and with methods of producing such electrodes.

It is often desirable to have available a cation sensitive glass electrode such as a glass pH electrode having a restricted or even a very minute area which is the sole area that is sensitive and in which the desensitized areas are durable, forming substantially an integral part of the electrode, and do not exhibit a tendency to pick up water or other solvents so as to destroy the effectiveness of the electrodes or to give rise to faulty or erroneous readings. One specific example of the need for such a glass electrode is the determination of the pH existent within the interiors of single living cells which requires a glass pH electrode having a pH sensitive probe area approximately 1 micron in diameter and 10 microns in length. The provision of such a specialized electrode is made possible through the present invention. Of course, numerous other applications exist and will be encountered.

It is therefore, a principal object of this invention to provide improved cation sensitive glass electrodes and methods of producing the same in which the sensitive areas of the electrode may be limited to any selected or desired area or areas and in which the desensitized area or areas are very durable in nature and are not subject to deterioration, absorption of water or other solvents, or other responses affecting the verity of the readings observed.

A further object of the invention is to provide improved cation sensitive glass electrodes and methods of producing the same wherein the degree of inhibition of sensitivity may be established at the desired level through variation in the duration of the time of treatment, variation in the temperature of treatment, variation in the number of times the treatment is repeated, or through combinations of one or more of the foregoing variable factors.

Yet another object of the invention is to provide improved cation sensitive glass electrodes and methods of producing the same wherein the electrode by treatment with certain selected materials under certain selected conditions results in the inhibition of the sensitivity of selected areas or portions of the electrode, and wherein the sensitivity may be restored in such regions as may be desired or selected through suitable subsequent treating steps.

Other and more particular objects of the invention will be readily apparent from the following description.

The modes of carrying out the invention will be hereinafter described, together with other features of the invention. The invention will be more readily understood from a reading of the following specification.

In carrying out the invention and practicing the methods thereof the cation sensitive glass surface or surfaces of the glass electrode are suitably exposed or contacted with silver or copper salts, or mixtures thereof, under elevated temperatures until the desired compositional changes in the surficial layer of glass has been obtained. Without intent of restriction or limitation, the achieved result is presently believed to be an exchanging of the heavier ions for the alkali metal ions present in the glass, such exchange continuing to a greater or lesser degree of completeness, followed by conversion of the heavier metal ions in the surficial glass layers to an atomic state in colloidal form. The methods involved and the inhibited electrodes produced thereby have been found superior to previous methods, and electrodes produced thereby, in which inhibition of sensitivity has been sought through the partial coating of the glass electrodes with organic insulating materials such as asphaltic materials and polymerized silicones which do not bond well to the electrode and which tend to pick up water to form a short or shunt which destroys the effectiveness of the electrode or results in faulty and erroneous observations. Thus, in practicing the present invention, the sensitive cations, such as lithium and sodium, in the cation sensitive glass of the electrodes are replaced by heavy metal ions such as silver ions and cuprous ions, thus decreasing the sensitivity of the selected area or areas to the levels desired. Cupric salts may also be employed for the reason that when the requisite heating is carried out, some cuprous ions necessarily occur.

Any silver salt or cuprous salt may be employed provided it can be elevated to the necessary treating temperatures without decomposition or vaporization occurring although in some cases vapor treatment may also be employed. Cupric salts may be utilized, again if they do not decompose at the treating temperatures, and provided cuprous ions are produced by the heating step. As stated above, a silver salt alone may be employed, a cuprous salt alone, or a combination of the two types of salts.

In particular, in a combination of treating salts, from 35% to 67% silver chloride may be employed, together with 14% to 25% cuprous chloride and 21% to 40% ferric oxide ($Fe_2O_3$), employed as set out hereinbelow. In utilizing such a treating mixture and in conjunction with Corning No. 0150 pH sensitive glass, it was found employing standard buffered solutions the following results were obtained with an untreated glass electrode:

| pH: | Millivolts read |
|---|---|
| 7.0 | −320 |
| 4.0 | −165 |
| 6.0 | −270 |

After the electrode had been treated with a silver-copper composition as above set forth, the same buffered solutions gave the following readings:

| pH: | Millivolts read |
|---|---|
| 7.0 | −100 unstable. |
| 4.0 | −100 unstable. |
| 6.0 | −95 unstable. | indicating no rational or reliable measurement.

When the electrode had been etched with 10% ammonium bifluoride to expose a selected portion thereof, the solutions gave the following readings:

| pH: | Millivolts read |
|---|---|
| 7.0 | −330 |
| 4.0 | −155 |
| 6.0 | −270 | indicating a restoration of dependable equivalency between pH and observed electrode response.

As a specific example a treating composition containing by weight 50% silver chloride, 20% cuprous chloride and 30% ochre ($Fe_2O_3$) may be compounded and sufficient water added to this mixture, as may be required to facilitate the application of the paste or slurry to the pH sensitive portion or portions of a pH electrode being processed. The treating mixture may be applied by means of brushing, dipping, spraying, or in any other suitable or desirable manner, and the coated electrode is then heated at a temperature of 450° to 500° C. for a period of 10 to 30 minutes. The depth of the composition change and the degree of inhibition of pH sensitivity is dependent upon the duration of the heating, the temperature at which the heating is carried out, and can be further extended by repeating the application of the treating mixture and repetition of the heating step. The selected areas may be coated, or the entire electrode surface may be treated and the desired pH sensitivity of an area or areas restored by etching said areas with hydrofluoric acid, or by selected grinding and polishing operations to remove the insensitive surficial portion at the desired point or points.

An alternative method using only a silver salt was carried out by placing the electrode in molten silver chloride at about 500° C. and again continuing the heating in the molten salt bath for a period of 10 to 30 minutes, or for longer periods of time, the depth and completeness of the placing of the silver atoms in colloidal form in the surficial glass being dependent upon the length of time the treatment is continued and the temperature of the treatment. With this alternative method, the pH sensitive areas may be restored by etching or grinding and polishing as above noted. Depending upon the size and configuration of the pH sensitive area desired, the most convenient methods of obtaining the desired electrode usually resides in treating the entire electrode surface and then selectively etching with hydrofluoric acid or by carefully controlled grinding and polishing steps.

Again in testing this alternative method with Corning No. 0150 pH sensitive glass and treating the glass electrode by immersion in molten silver chloride at 500° C. for 20 minutes, the following results were obtained with buffered solutions:

pH: | Millivolts read
--- | ---
4.0 | } read as an
7.0 | } open circuit

After grinding the surface of the electrode over an area extending 1 centimeter from its tip with a conventional revolving grind stone the following readings were obtained:

pH: | Millivolts read
--- | ---
4.0 | +150
7.0 | −8

The glass electrode with silver salts or the above combination of silver and cuprous salts may readily be heated and worked as is the case with conventional glass electrodes, but this is not completely true when cuprous salts alone are employed for the treating operations.

As a third method of treating the glass pH electrodes, they may be exposed to the vapor from molten cuprous chloride and the electrode then exposed to the reducing vapors from hot sodium potassium tartrate. These steps may be carried out sequentially or simultaneously with both bodies of treating chemicals being maintained at or near the annealing tempearture of the glass being treated. Again, the selected areas of restoration of pH sensitivity may be exposed by etching or grinding and polishing.

Using this last-described method with Corning No. 0150 pH sensitive glass, the following results were obtained from the treated electrodes:

pH: | Millivolts read
--- | ---
4.0 | −176
7.0 | −175 showing no pH sensitivity. Then after the electrode had been etched for 5 minutes in 50% hydrofluoric acid it sensed pH as follows:

pH: | Millivolts read
--- | ---
4.0 | +137
7.0 | −16 showing the restoration of pH sensitivity in the etched area.

The temperature of the treatment may vary to some extent dependent upon the nature of the glass from which the glass pH electrodes are formed, the most desirable range of treating being at or near the annealing temperature of the glass. The latter, of course, is known or may readily be determined with respect to differing glasses. Further, it is to be noted that the pH or other meter with which the treated electrode is employed may need some slight degree of recalibration, but this is well within the scope of those skilled in this art and may be carried out utilizing standard solutions and well known techniques.

Several glasses are known to exhibit so-called pH sensitivity such as sodium oxide, silica, calcium oxide glass which is best treated at 450°–500° C., silica, barium oxide, lithium oxide glass which is best treated at 400–450° C. as is soda lime glass containing uranium oxide.

There are also glasses sensitive to sodium ions such as the sodium sensitive glass $NAS_{11-18}$, described in United States Patent No. 2,829,090 to Eisenman, which is best treated at aboupt 650° C. The term $NAS_{11-18}$ used herein and in said Eisenman patent refers to a glass having a composition comprising 11 mol percent $Na_2O$, 18 mol percent $Al_2O_3$ and 71 mol percent $SiO_2$. Also, glasses sensitive to potassium ions such as Eisenman's potassium sensitive glass $NAS_{27-3(3Zno)}$ may be used. This term refers to a glass having a composition of 27 mol percent $Na_2O$, 3 mol percent $Al_2O_3$, 3 mol percent Zno and the remainder $SiO_2$. The latter two glasses tend also to display pH sensitivity and the $NAS_{27-3(3Zno)}$ glass shows some sodium sensitivity giving rise to incorrect readings. Both, however, may be treated in accordance with this invention for delineating restricted sensitive areas while inhibiting sensitivity in other areas. In each instance, the glass is treated at or near its annealing temperature.

Utilizing electrodes formed of Eisenman's $NAS_{11-18}$ glass and test solutions in which the sodium concentration is expressed in milliequivalents per liter, a 1 normal, or in the case of sodium, a 1 molar, solution being equivalent to a 1000 milliequivalent per liter solution or 1000 meq./l., the following test results were obtained:

Na+meq./l.: | Millivolts read
--- | ---
10 | −155
100 | −97
1000 | −40 showing a Na+ion response. After the electrode had been treated the following data were observed:

Na+meq./l.: | Millivolts read
--- | ---
10 | +102, +98
100 | +97, +100
1000 | +94, +95 the repetitive readings showing no correlation to sodium ion concentration.

Next, a portion of the treated area was etched with 50% hydrofluoric acid and the following readings observed:

Na+meq./l.: | Millivolts read
--- | ---
10 | −135
100 | −76
1000 | −18 showing a restoration in a limited area of sensitivity to sodium ion concentration.

Beckman Cation Sensitive Glass No. 548, sensitive to sodium and potassium concentrations, was treated with a silver-copper salt mixture as previously described, and the following readings obtained:

Na+meq./l.: | Millivolts read
--- | ---
10 | −82
100 | −76
1000 | −56 again showing no correlation between the readings and the sodium ion concentration. After a portion of the electrode had been etched with 50% hydrofluoric acid the readings were:

| Na+meq./l.: | Millivolts read |
|---|---|
| 10 | −20 |
| 100 | +38 |
| 1000 | +100 | indicating selected restoration of sensitivity.

Beckman Sodium Sensitive Glass No. 659 was similarly treated with the following results before etching:

| Na+meq./l.: | Millivolts read |
|---|---|
| 10 | −140 |
| 100 | −170 |
| 1000 | −160 | and restored sensitivity after etching as follows:

| Na+meq./l.: | Millivolts read |
|---|---|
| 10 | −131 |
| 100 | −74 |
| 1000 | −18 |

As pointed out hereinbefore, the various glasses are treated at or near their annealing temperatures, and the treating continued until inhibition is obtained. This does not appear to be a gradual process in that if the treating is insufficient, the resistance of the electrode may increase slightly but it will still read pH or cation concentration. A fairly abrupt change takes place after 10 to 30 minutes treatment, cation sensitivity being completely lost and being restorable in selected areas by etching or grinding. Thus the time of treating for any particular glass is readily determined by continuing the treating until inhibition is observed.

Another method of establishing or re-establishing sensitive areas is to treat the glass, such as a capillary tube, and then heat and draw the glass to a fine tip. The tip thus formed is cation sensitive, but it is not known whether this is due to a stretching out of the treated area or the pulling out of an untreated layer of glass from beneath the treated layer.

In all cases, either selected areas are treated for inhibition of cation sensitivity, or the entire areas treated and selected portions exposed by any suitable or desirable method to re-establish the cation sensitivity thereof.

The foregoing description of the invention is explanatory thereof and various changes in the proportions and materials, as well as in the details of the described methods may be made, within the scope of the appended claims, without departing from the spirit of the invention.

What I claim and desire to secure by Letters Patent is:

1. The method of desensitizing selected areas of cation sensitive glass electrodes so as to inhibit sensitivity in said selected areas including, contacting the selected area with a substance, said substance having at least one of the salts selected from the group consisting of silver and copper salts, and heating at least the selected area while in contact with the substance to approximately the annealing temperature of the glass for a period of time not less than approximately 10 minutes.

2. The method of desensitizing selected areas of cation sensitive glass electrodes so as to inhibit sensitivity in said selected areas including, contacting the selected area with a salt selected from the group consisting of silver, cuprous and cupric salts, and heating at least the selected area while in contact with the salt to approximately the annealing temperature of the glass for a period of time not less than approximately 10 minutes.

3. The method of desensitizing selected areas of glass pH electrodes so as to inhibit pH sensitivity in said selected areas including, contacting the selected area with a silver salt, and heating at least the selected area while in contact with the salt to a temperature of 450° C. to 500° C. for a period of time not less than approximately 10 minutes.

4. The method of desensitizing selected areas of glass pH electrodes so as to inhibit pH sensitivity in said selected areas including, contacting the selected area with a cuprous salt, and heating at least the selected area while in contact with the salt to a temperature of 450° C. to 500° C. for a period of time not less than approximately 10 minutes.

5. The method of desensitizing selected areas of glass pH electrodes so as to inhibit pH sensitivity in said selected areas including, contacting the selected area with a mixture of silver and cuprous salts, and heating at least the selected area while in contact with the salt to a temperature of 450° C. for a period of time not less than approximately 10 minutes.

6. The method of desensitizing selected areas of glass pH electrodes so as to inhibit pH sensitivity in said selected areas including, applying to the selected area a mixture containing by weight approximately 50% silver chloride and approximately 20% cuprous chloride in a liquid vehicle, and heating at least the selected area while in contact with said mixture to a temperature of 450° C. to 500° C. for 10 to 30 minutes.

7. The method of desensitizing selected areas of glass pH electrodes so as to inhibit pH sensitivity in said selected areas including, applying to the selected area a mixture containing by weight approximately 50% silver chloride and approximately 20% cuprous chloride and approximately 30% iron oxide in a liquid vehicle, and heating at least the selected area while in contact with said mixture to a temperature of 450° C. to 500° C. for 10 to 30 minutes.

8. The method of desensitizing selected areas of glass pH electrodes so as to inhibit pH sensitivity in said selected areas including, contacting said selected area with molten silver chloride at a temperature of approximately 500° C., and continuing such contacting until the desired degree of pH sensitivity inhibition has been obtained.

9. The method of desensitizing selected areas of glass pH electrodes so as to inhibit pH sensitivity in said selected areas including, contacting said selected area with molten cupric chloride at a temperature of approximately 500° C., and continuing such contacting until the desired degree of pH sensitivity inhibition has been obtained.

10. The method of desensitizing selected areas of glass pH electrodes so as to inhibit pH sensitivity in said areas including, exposing said selected area to vapor from molten copper chloride until a substantial percentage of the alkali metal ions have been replaced by copper, and exposing said area to the reducing atmosphere of sodium potassium tartrate heated to approximately the annealing temperature of the glass until the copper converts to atomic copper in colloidal form.

11. The method of desensitizing selected areas of glass pH electrodes so as to inhibit pH sensitivity in said areas including, contacting the selected area with a salt selected from the group consisting of silver chloride and cuprous chloride, heating at least the selected area while in contact with the salt for not less than approximately 10 minutes to approximately the annealing temperature of the glass from which the electrode is made, and removing the surficial portion of a part of the selected area.

12. The method of desensitizing selected areas of cation sensitive glass electrodes including, contacting the cation sensitive area of the electrode with at least one salt selected from the group consisting of silver chloride and copper chloride, heating the cation sensitive area while in contact with the salt to approximately the annealing temperature of the glass for a period of time not less than approximately 10 minutes to form a desensitized surface on the cation sensitive area, and then exposing a selected cation sensitive portion from beneath the desensitized surface.

13. A composition for treating cation sensitive glass electrodes including, 35–67% silver chloride, 14–25% cuprous chloride, and 21–40% ferric oxide.

14. The method of desensitizing selected areas of

14. ...cation sensitive glass electrodes so as to inhibit sensitivity in said selected areas including contacting the selected area with a mixture containing 35–67% silver chloride and 14–25% cuprous chloride, and heating at least the selected area while in contact with the mixture to approximately the annealing temperature of the glass for a period of time not less than approximately 10 minutes.

15. The method of desensitizing selected areas of cation sensitive glass electrodes so as to inhibit sensitivity in said selected areas including contacing the selected area with a mixture containing 35–67% silver chloride, 21–40% ferric oxide and 14–25% cuprous chloride, and heating at least the selected area while in contact with the mixture to approximately the annealing temperature of the glass for a period of time not less than approximately 10 minutes.

16. A cation sensitive glass electrode having in its outer cation sensitive surface a selected area with an inhibited cation sensitivity, said selected area comprising essentially atoms in colloidal form of a metal selected from the group consisting of silver and copper.

17. A cation sensitive glass electrode having in its outer cation sensitive surface a selected area with an inhibited cation sensitivity, said selected area comprising essentially silver atoms in colloidal form.

18. A cation sensitive glass electrode having in its outer cation sensitive surface a selected area with an inhibited cation sensitivity, said selected area comprising essentially copper atoms in colloidal form.

19. A glass pH electrode having in its outer pH sensitive surface a selected area with an inhibited pH sensitivity, said selected area comprising essentially atoms in colloidal form of a metal selected from the group consisting of silver and copper.

20. A cation sensitive glass electrode having in its outer cation sensitive surface a selected area with an inhibited cation sensitivity, said selected area comprising essentially colloidal metal selected from the group consisting of colloidal silver and colloidal copper.

21. A cation sensitive glass electrode having in its outer cation sensitive surface a selected area with an inhibited cation sensitivity, said selected area having incorporated therein a metal selected from the group consisting of silver and copper.

22. A cation sensitive glass electrode having in its outer cation sensitive surface a selected area with a reduced cation sensitivity, said selected area having incorporated therein a metal selected from the group consisting of silver and copper.

23. A cation sensitive glass electrode having in its outer cation sensitive surface a selected area with a reduced cation sensitivity, said selected area comprising essentially colloidal metal selected from the group consisting of colloidal silver and colloidal copper.

24. The method of desensitizing selected areas of cation sensitive glass electrodes so as to inhibit sensitivity in said selected areas including, contacting the selected area with an ion selected from the group consisting of silver and copper ions, and heating at least the selected area while in contact with the ion to approximately the annealing temperature of the glass for a period of time not less than approximately 10 minutes.

25. The method of desensitizing a selected area of cation sensitive glass electrodes so as to inhibit sensitivity in said selected area including, contacting the cation sensitive glass of the electrode with a substance, said substance having at least one of the salts selected from the group consisting of silver and copper salts, heating the cation sensitive glass while in contact with the substance to approximately the annealing temperature of the glass for a period of time not less than approximately 10 minutes, and restoring the cation sensitivity of an area of said glass other than said selected area.

26. The method as set forth in claim 25 in which the restoring of the cation sensitivity is performed by etching said area of said glass other than said selected area.

27. The method as set forth in claim 25 in which the restoring of the cation sensitivity is performed by grinding and polishing said area of said glass other than said selected area.

28. The method of at least partially desensitizing selected areas of cation sensitive glass electrodes so as to control the cation sensitivity in said selected areas including, contacting the selected area with a substance, said substance having at least one of the salts selected from the group consisting of silver and copper salts and heating the selected area while in contact with the substance to a sufficient temperature and for sufficient time to replace at least some of alkali metal ions in said selected area by the metal of said substance.

29. The method as set forth in claim 28 wherein said salts are silver chloride and copper chloride.

30. The method of at least partially desensitizing selected areas of cation sensitive glass electrodes so as to control the cation sensitivity in said selected areas comprising, contacting the selected area with a salt selected from the group consisting of copper and silver salts and heating the selected area while in contact with the salt to approximately the annealing temperature of the glass for sufficient time to incorporate at least some of the metal of said salt into said selected area.

References Cited in the file of this patent

UNITED STATES PATENTS

| | | |
|---|---|---|
| 2,117,596 | Bender et al. | May 17, 1938 |
| 2,366,489 | Cary et al. | Jan. 2, 1945 |